June 13, 1961  J. W. BLACK  2,987,752
CASTER
Filed Nov. 10, 1958
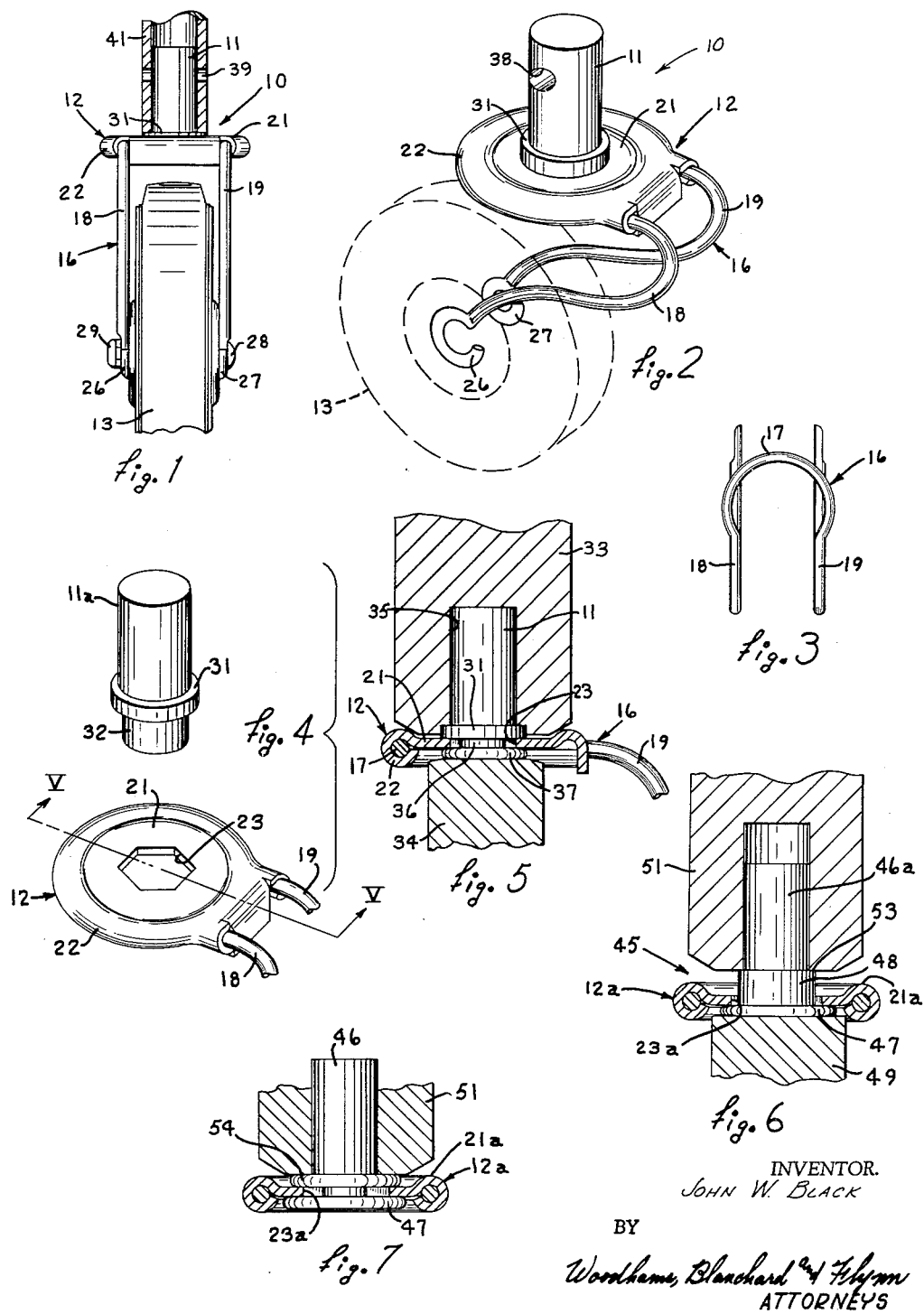
INVENTOR.
JOHN W. BLACK
BY
Woodhams, Blanchard & Flynn
ATTORNEYS

United States Patent Office 2,987,752
Patented June 13, 1961

2,987,752
CASTER
John W. Black, Prairieville Township, Barry County, Mich., assignor to Pemco Wheel Company, Kalamazoo, Mich., a corporation of Michigan
Filed Nov. 10, 1958, Ser. No. 772,944
5 Claims. (Cl. 16—44)

This invention relates in general to a wheel supporting structure for a caster and to a method for effecting a non-rotatable connection between the spindle and mounting plate of a caster yoke having a resiliently flexible member secured to said mounting plate and rotatably supporting the wheel.

Wheeled supporting structures, particularly of the type often referred to as casters, have been known to exist for a very long time. Among such casters are those used, for example, to support various types of article holding devices, such as the shopping carts often used in supermarkets. Existing caster constructions have not been entirely satisfactory for use on shopping carts for reasons which are set forth in detail in patent application Serial No. 726,536, now Patent No. 2,923,961, of which this application is a continuation-in-part. Briefly, existing yoke structures, which rotatably support the caster wheel, are conventionally rigid. Accordingly, the shocks created by impacts between the wheel and objects which come in the path of such wheel as it rolls along the floor are transmitted substantially undiminished directly to the yoke structure and to the connection between the yoke and the spindle mounted upon the yoke.

In order to withstand these shocks, it is presently necessary to provide heavy duty yoke and spindle constructions which are not required merely to support the dead weight of the object mounted upon the caster structures. It follows that the costs of material and construction are, therefore, also higher than necessary. However, in spite of the reserve strength in present caster constructions, the above-mentioned shock loads tend to bend the yoke and/or spindle and often loosen the connection between the spindle and the yoke. Other problems resulting from the rigid yoke construction are dealt with in detail in said application Serial No. 726,536, and reference is made thereto for such further details.

Where the caster is mounted for non-swiveling operation, the relative rotation between the spindle and the yoke creates an intolerable situation which, at present, can be overcome only by replacing the entire caster. However, even where it is intended that the spindle be capable of swiveling with respect to the object which the caster supports, a loosening between the spindle and the yoke tends to promote a premature breakdown in the caster. That is, relative movement between the spindle and the yoke creates an abnormal wearing at the connection between the spindle and the yoke, which tends to accelerate the looseness, hence the breakdown of the caster.

According to existing practices of mounting spindles upon yokes, the mounting plate on the yoke is provided with a circular opening through which the cylindrical spindle is inserted and thereafter held in position by a forging operation which upsets a portion of the spindle against the mounting plate. Thus, relative rotation between the spindle and the yoke is opposed primarily by friction, only, which is often overcome by a small force twisting the yoke or wheel around the spindle axis while holding the spindle against rotation. Once the first rotative movement has occurred, later relative rotative movements between the spindle and the yoke occur much easier and total failure of the caster usually follows soon thereafter.

Usually, however, the breakdown of the yoke and spindle connection commences with an impact between the wheel and an object in its path, which impact breaks the frictional grip of such connection after which relative rotative movement follows readily. Thus, in order to reduce these breakdowns in spindle type caster constructions, it becomes necessary not only to reduce the transmission of shock loads to the yoke and spindle connection, but also to oppose positively any relative rotation between the yoke and spindle.

Having recognized that caster breakdowns usually stem, either directly or indirectly, from a relative rotation between the spindle and the wheel supporting yoke, one approach for overcoming the problem would be to provide an out-of-round opening in the mounting plate of the yoke and then fabricate a spindle having a corresponding out-of-round portion for snug insertion into, and in cooperation with, the out-of-round opening. Such a structure is disclosed in my co-pending patent application Serial No. 658,627, entitled "Caster Yoke and Spindle Assembly," and now abandoned. However, the provision of such an out-of-round shank on the spindle requires special machining operations, hence an added cost. Even a small increase in cost in an established type of commodity, such as casters, can render the product non-competitive. Thus, it is essential that the above-mentioned problems be overcome without increasing the cost of the product and, if possible, by actually reducing the cost while increasing the efficiency. As it will be seen, my improved spindle and yoke construction is capable of such accomplishments, primarily because it can be made of less costly materials and in a manner to promote a much longer useful life. The non-rotatable connection between the yoke and spindle, as detailed hereinafter, as well as the method of producing same comprise the non-elected species of my above-mentioned patent application Serial No. 658,627.

Accordingly, a primary object of this invention has been the provision of a mounting structure including a resiliently flexible yoke rotatably supporting a wheel and secured to a spindle, whereby rotation of said yoke with respect to said spindle around the axis of said spindle is positively opposed.

A further object of this invention has been the provision of a caster construction wherein the connection between the wheel supporting yoke and the spindle is capable of more positive resistance to relative rotation between these elements, wherein said connection is made more rigid as a result of the operation performed to increase said resistance to rotation, and wherein there is structure between the yoke and the wheel which materially reduces the intensity of the shock loads transmitted to said connection as a result of impacts applied to the wheel.

A further object of the invention has been the provision of a method for producing the non-rotatable, more durable connection between the spindle and the mounting plate of the caster construction.

A further object of this invention has been the provision of a method, as aforesaid, wherein the connection between the spindle and yoke of said caster construction is effected by inserting a spindle of circular cross section through an opening in the mounting plate of the yoke, which opening has an out-of-round cross section, and then compressing that portion of the spindle disposed adjacent to said opening so that the metal thereof flows radially and substantially fills said out-of-round opening.

A further object of the invention has been the provision of a caster construction including said mounting structure, as aforesaid, wherein the connection between the spindle and the wheel-supporting yoke includes an out-of-round opening in the mounting plate of the yoke and the provision of a corresponding out-of-round portion in the spindle which is snugly and non-rotatably held within the said opening, said out-of-round portion being formed during the assembly operation and without necessitating separate, special machining operations on the spindle.

A further object of this invention has been the provision of a caster construction, as aforesaid, which is capable of longer use, which can be manufactured economically, which is sturdy in construction, which has a pleasing appearance and which can be used either as a swivel caster or as a stationary caster with respect to the object which it supports.

Other objects and purposes of this invention, including some of those set forth in said application Serial No. 726,536, will become apparent to persons familiar with this type of equipment upon reading the following specification and examining the accompanying drawings, in which:

FIGURE 1 is a broken front elevational view of a wheel mounting or caster construction embodying the invention.

FIGURE 2 is a perspective view of said caster construction, the wheel being in broken lines.

FIGURE 3 is a top view of the resilient portion of the yoke of said caster construction.

FIGURE 4 is an exploded view of the upper portion of the caster yoke and the spindle prior to assembly thereof.

FIGURE 5 is a sectional view substantially as taken along the line V—V in FIGURE 4, showing the spindle and yoke in the assembled position along with the dies for effecting such assembly.

FIGURE 6 is a sectional view showing a modified spindle in combination with a caster yoke and dies for effecting their connection.

FIGURE 7 shows the structure in FIGURE 6 after after assembly of the spindle and yoke.

For the purpose of convenience in the description, the terms "upper," "lower" and derivatives thereof as used herein will have reference to the caster construction of the invention in its normal position of use and as appearing in FIGURES 1 and 2. The terms "inner," "outer" and derivatives thereof will have reference to the geometric center of said caster construction and parts thereof. The terms "front," "rear" and derivatives thereof will have reference to the normal direction of movement of said caster construction, the front thereof appearing in FIGURE 1.

General description

The objects and purposes of the invention, including those set forth above, have been met by providing a caster construction and a method of making same wherein a cylindrical spindle is received into and circumscribed by an out-of-round opening in the mounting plate of a wheel supporting yoke. The spindle is provided with one external annular flange which embraces one side of the mounting plate around said opening therein. Another flange is provided by upsetting or forging a portion of said spindle adjacent to said opening while at the same time causing the material of the spindle to flow into and fill the opening in the mounting plate.

The yoke also includes a pair of co-extensive, substantially parallel and resiliently flexible elements which are secured to said mounting plate and curve away from a plane defined by said plate through an angle in excess of about 120°. A wheel is rotatably supported upon and between the free ends of said flexible elements which are preferably provided with eyelets for engaging the wheel shaft. The spindle may be either rotatably or rigidly held with respect to the object which the caster construction supports. The wheel supporting elements of the yoke are sufficiently resilient and flexible to permit upward and downward movement of the wheel with respect to the mounting plate, hence the spindle, in response to the weight supported by the caster and the shock loads absorbed by said wheel.

Detailed construction

The caster construction 10 (FIGURES 1 and 2), herein selected to illustrate a preferred embodiment of the invention, is comprised of a spindle 11 rigidly mounted upon a yoke 12 which rotatably supports a wheel 13. The yoke 12 includes a U-shaped resiliently flexible member 16 (FIGURE 3) having a circular closed end portion 17 from which two co-extensive, substantially parallel and resiliently flexible elements 18 and 19 extend. A substantially circular mounting plate 21 (FIGURES 4 and 5), having a flange 22 extending around the periphery thereof, is disposed upon the circular portion 17 of the flexible member 16 so that the flange 22 rigidly embraces said circular portion. Said mounting plate 21 (FIGURE 4) has a concentric, out-of-round opening 23 which is hexagonal and equilateral in this particular embodiment.

The flexible elements 18 and 19 (FIGURE 2) as they leave the flange 22 curve downwardly and rearwardly from the plane defined by the circular portion 17 of the flexible member 16 through an arc in excess of 120° but less than 180°. The rearward, free ends of the flexible elements 18 and 19 have integral, co-axial loops 26 and 27, respectively, through which the axle 28 (FIGURE 1), which may be a bolt, extends for the purpose of supporting the wheel 13 mounted thereon. Means such as the nut 29 may be threadedly engaged with the end of the axle bolt 28 for holding same with respect to said flexible elements 18 and 19. The flexible elements 18 and 19, as appearing in FIGURES 2 and 3, preferably extend from points on the front side of the spindle 11 to points on the rearward side of the spindle 11 so that the axis is on the rearward side of the spindle axis. The wheel 13 may be of any conventional type, such as one having a metal hub and a resilient tread.

The spindle 11 (FIGURE 5) is fabricated from a cylindrical preform 11a having an external, annular and integral flange 31 spaced from both ends thereof, but preferably closer to the lower end 32. The said lower end 32 has a diameter below the flange 31 preferably identical with the diameter of the circle inscribed by the opening 23 so that said lower end can be slidably and snugly inserted into the opening 23 until the flange 31 engages the upper surface of the mounting plate 21.

According to the teachings of the method of the invention, preform and yoke are placed between the upper and lower dies 33 and 34 (FIGURE 5) of an appropriate machine, such as a press brake, whereby the lower extremity of the spindle 11 is upset against the lower surface of the mounting plate 21 to form the bottom flange 37. The recess 35 in the upper die 13 is carefully shaped so that it embraces substantially the entire upper portion of the spindle 11 during this upsetting or staking operation in order to prevent any distortion in the upper portion of the spindle 11 or the upper flange 31. If necessary, however, the upper flange 31 may be shaped on the preform 11a so that it is axially oversized and radially undersized. Thus, the staking operation can be utilized to complete the formation of the flange 31, the preform 11a can be made from stock of a smaller outside diameter and the upper flange 22 will be work-hardened.

The dies 33 and 34 are arranged in FIGURE 5 so that the assembly of the spindle and yoke are accomplished in an upright condition. Obviously, the positions of the dies can be reversed and this may be advantageous in that the mounting plate 21 will then be held against the flange 31 by gravity.

During the upsetting of the lower end 32 of the spindle 11 (FIGURE 5), by which the bottom flange 37 is formed, the metal in the lower end of said spindle is simultaneously caused to flow radially outwardly to fill the hexagonal opening 23. This forging operation not only forms a flange 37 and an out-of-round shank 36 on said spindle 11, but also work-hardens the lower end of the spindle, thereby strengthening the spindle at the point where failure has previously tended to start. Furthermore, the shank 36 is formed on the spindle 11 without an additional machining step being performed on the lower end 32 of the spindle 11.

A pin opening 38 (FIGURE 2) may be provided through the spindle 11 near its upper end to receive a pin 39 (FIGURE 1) for the purpose of holding spindle 11 rigidly and non-rotatably within the leg 41 of a table or shopping cart, for example. Where pivotal movement of the spindle 11 with respect to the object which it supports is desired, the pin opening 38 and the pin 39 therefor are omitted. In such case, a sleeve bearing of conventional type, not shown, may be provided for engaging the spindle 11.

*Operation and assembly*

When the caster 10 is properly installed, as with the spindle 11 inserted into means such as the leg 41 (FIGURE 1), whether rigidly or pivotably, the flexible elements 18 and 19 of the yoke 12 will flex rearwardly and upwardly as the result of, and immediately following, an impact between the wheel 13 and an object in its path. In this manner, the flexible elements 18 and 19 will reduce or cushion the transmission to the spindle 11 and the objects supported thereby the shock created by said impact.

The flexible elements 18 and 19 are preferably selected so that they will be flexed upwardly somewhat under the weight of the object, such as a partially loaded shopping cart, which they support. Thus, where two or more of the casters 10 are used for supporting said cart, said flexible elements provide for automatic level adjustment of said cart with respect to the surface engaged by the wheels 13. That is, if a particular wheel 13 engages a high spot in an irregular surface, the flexible elements 18 and 19 will bend upwardly under the increased load imposed upon the particular wheel concerned, thereby permitting the other wheels supporting the object to remain in load supporting engagement with the floor surface.

On the other hand, if a particular wheel 13 passes over a low spot in an irregular floor surface, the flexed elements supporting such wheel will cause said wheel to move downwardly and continue its load supporting engagement with the floor surface. This self-leveling action produced by the spring elements in the caster construction 10 greatly reduces many of the problems, such as caster vibration, which lead to a premature or accelerated caster failure. Furthermore, the flexibility in the spring elements 18 and 19 which support the wheel overcome the need for heavy duty yoke construction, the rigidity of which tends to compound the very problems which they attempt to avoid. For further details in this respect, reference is made to said co-pending application Serial No. 726,536.

The shock absorbing features of the wheel mounting structure 10 operate the same whether the spindle 11 is rigidly or pivotably engaged with the object which it supports. However, when the spindle 11 is held rigidly with respect to the object which the caster 10 supports, the out-of-round connection between the lower end of the spindle 11 and the mounting plate 21 positively prevents rotation of the yoke 12 with respect to the spindle 11 even when substantial torques are applied to said yoke around the axis of the spindle 11.

As set forth above, the out-of-round shank 36 is produced during the forging or staking operation which provides the flange 31 at the lower extremity of the spindle 11 (FIGURE 5). As mentioned above, the wheel 13 or yoke 12 are often subjected during the normal operation of the caster construction 10 to forces which tend to rotate these parts with respect to the spindle 11 about the axis thereof. Where, as here, the yoke 12 includes a flexible member 16, a substantial portion of these forces, particularly where they result from a sudden impact, are at least partially dissipated by the flexing of the flexible elements 18 and 19 in a direction transverse of the axis of said spindle 11. Thus, relative rotation between the spindle 11 and the yoke 12 or wheel 13 about the axis of the spindle is not only positively opposed by the out-of-round connection between the spindle and the mounting plate 21, but also avoided by the flexibility in the flexible elements 18 and 19.

It has also been found that the lateral and vertical flexibility in the elements 18 and 19 promotes easy handling of objects supported upon non-swiveled casters 10. For example, where a pair of fixed casters 10 are mounted upon the rear of a shopping cart, such cart can be turned more easily. This is accomplished by pushing down slightly on the rear corner facing the direction in which a turn is desired, which is impossible with the existing, rigid yoke constructions.

Where the spindle 11 is pivotably engaged with the object which the caster 10 supports, relative rotational movement between the spindle 11 and the mounting plate 21 around the axis of the spindle 11 usually initiates a breakdown in the caster by permitting wear to occur in a region not designed to take such wear. Thus, the prevention of relative rotation between the spindle and the mounting plate is also important in a caster construction where rotation of the yoke and wheel around the spindle axis is desired.

FIGURE 7 discloses an alternate construction 45 including a spindle 46 with an integral, exterior and annular flange 47 at its lower extremity. The mounting plate 21a has an out-of-round opening 23a (FIGURE 6) through which said spindle extends until the flange 47 engages the lower surface of said plate. The portion 48 of the spindle preform 46a adjacent to the flange 47 preferably has a diameter which is substantially equal to the diameter of the circle inscribed by said out-of-round opening 23a. The portion 48 is of larger diameter than the upper end of the spindle preform and is substantially longer in axial length than the thickness of the mounting plate 21a.

During the assembly of the spindle 46 with the yoke 12a, according to the method of the invention, the flanged lower end of the spindle preform 46a (FIGURE 6) is engaged by the lower die 49 of a press brake, not shown. The upper die 51 of said press brake has a circular recess 52 into which the spindle preform is slidably received down to the shoulder 53 at the upper end of the enlarged portion 48. When the dies 49 and 51 are moved toward each other, the upper die 51 causes the portion 48 to be upset downwardly, thereby forming the flange 54 (FIGURE 7) as said upper die moves from its FIGURE 6 position into its FIGURE 7 position. At the same time, a part of the metal in the portion 48 is caused to flow radially outwardly into substantially snug engagement with the walls of the opening 23a in the mounting plate 21a. Because of the relatively small axial surface on the shoulder 53 by comparison with the axial surface at the lower end of the spindle preform, substantially all of the material flow during the forging operation will occur in the portion 48. However, allowances can be made in the flange 47 on the preform 46a for any compression thereof which may be caused by said dies.

After assembly of the spindle 46 on the yoke 12a, the alternate caster construction 45 is ready for operation in a manner substantially the same as set forth above with respect to the caster 10. Thus, it will be seen that the method of the invention can be carried out to produce a non-rotatable connection between the spindle and yoke of a caster wherein a variety of different spindle preforms are used.

Although particular and preferred embodiments of the invention have been disclosed above for illustrative purposes, it will be understood that variations or modifications of such disclosure, which lie within the scope of the appended claims, are fully contemplated.

What is claimed is:

1. A caster construction including resiliently flexible and offset structure for supporting a wheel upon an object having a downwardly opening, vertical recess, comprising: a substantially U-shaped member formed from a resiliently flexible rod having a substantially uniform cross-sectional shape throughout its length, said U-shaped member having an arcuate end portion defining a circle and extending in excess of 225 degrees around said circle and a pair of co-extensive and parallel elements integral with said arcuate end portion and curving out of a plane defined by said circle through angles in excess of 120 degrees, said elements defining a pair of planes substantially perpendicular to said first plane and spaced from each other a distance less than the diameter of said circle, the free ends of said elements including portions of rings defining coaxial circles; a wheel-supporting axle extending through said rings for support thereby; a mounting plate having a central, substantially planar portion, the outer edge of which defines a second circle of smaller diameter than said first circle, said central portion having a polygonal opening therethrough; an integral flange extending substantially around the periphery of said mounting plate, said arcuate end portion being snugly disposed within said flange, said peripheral flange having a substantially circular cross section and a pair of spaced openings through which the adjacent parts of said parallel elements extend; a spindle extending through said polygonal opening and substantially above said mounting plate, said spindle having a pair of annular, external and integral flanges snugly embracing the opposite sides of said mounting plate, the portion of the spindle disposed between said flanges being of substantially the same size and cross-sectional shape as said opening, whereby relative rotation between aid mounting plate and said spindle is positively prevented.

2. A caster construction including resiliently flexible and offset structure for supporting a wheel upon an object having a downwardly opening, vertical recess, comprising: a substantially U-shaped member formed from a resiliently flexible rod having a circular cross-section of substantially uniform diameter throughout its length, said U-shaped member having an arcuate end portion defining a circle and extending in excess of 225 degrees around said circle and a pair of co-extensive and parallel elements integral with said arcuate end portion and curving out of a plane defined by said circle through angles in excess of 120 degrees, said elements defining a pair of spaced and parallel planes perpendicular to said first plane and spaced from each other a perpendicular distance less than the diameter of said circle, the free ends of said elements being curved to form portions of rings defining coaxial circles; a wheel-supporting axle extending through said rings for support thereby; a mounting plate having a central, substantially planar portion, the outer edge of which defines a second circle of smaller diameter than said first circle, said central portion having a polygonal opening substantially concentric therewith; an integral flange extending substantially around the periphery of said mounting plate, said arcuate end portion being snugly disposed within said flange, said peripheral flange having a substantially circular cross-section and a pair of spaced openings through which the adjacent parts of said parallel elements extend, said flange projecting beyond both sides of said planar portion of said mounting plate; a spindle of substantially circular cross-section extending through said polygonal opening and substantially above said mounting plate, said spindle having a pair of annular, external and integral flanges snugly embracing the opposite sides of said mounting plate, one of said flanges being adjacent to the lower end of said spindle, the portion of the spindle disposed between said flanges being of the same size and cross-sectional shape as said opening, whereby relative rotation between said mounting plate and said spindle is positively prevented.

3. A resiliently flexible and offset structure for supporting a wheel upon an object having a downwardly opening, vertical recess, comprising: a substantially U-shaped, resiliently flexible member having an arcuate closed end portion defining a plane and a pair of co-extensive, substantially parallel elements curving out of said plane through angles in excess of 120°, said elements defining spaced parallel planes substantially perpendicular to said first-mentioned plane; an axle supporting said wheel and means supporting said axle upon and between the free ends of said elements; a substantially circular mounting plate having a flange extending substantially around the periphery thereof, said arcuate portion of said flexible member being disposed within and against said flange and rigidly secured to said plate, said plate being substantially parallel with said first-mentioned plane and having a polygonal opening substantially concentric with said plate; a spindle of substantially circular cross section snugly disposed within said polygonal opening and extending substantially above said mounting plate for slidable reception into the downwardly opening recess, said spindle having a pair of annular external and integral flanges snugly embracing the opposite sides of said mounting plate, one of said flanges being adjacent to the lower end of said spindle and the portion of the spindle disposed between said flanges having a polygonal shape substantially identical in size and shape to said polygonal opening, whereby relative rotation between said mounting plate and said spindle is positively prevented.

4. A resiliently flexible and offset structure for supporting a wheel upon an object having a downwardly opening, vertical recess, comprising: a substantially U-shaped, resiliently flexible member having an arcuate closed end portion defining a plane and a pair of co-extensive, substantially parallel elements defining spaced parallel planes substantially perpendicular to said first-mentioned plane, and said member having a cross-sectional area of substantially uniform size throughout its length; an axle supporting the wheel, and annular means supporting said axle upon and between the free ends of said elements; a substantially circular mounting plate having a flange extending substantially around the periphery thereof, said arcuate portion of said flexible member being snugly embraced by said flange and rigidly secured to said plate, said plate being substantially parallel with said first-mentioned plane and having a substantially concentric, polygonal opening; a spindle of substantially circular cross section snugly disposed within said polygonal opening and extending substantially above said mounting plate for slidable reception into the downwardly opening recess, said spindle having a pair of annular, external and integral flanges snugly embracing the opposite sides of said mounting plate, one of said flanges being adpacent to the lower end of said spindle and the portion of the spindle disposed between said flanges having a polygonal shape substantially identical in size and shape with said polygonal opening, whereby relative rotation between said mounting plate and said spindle is positively prevented.

5. A caster construction including resiliently flexible and offset structure for supporting a wheel upon an object having a downwardly opening, vertical recess, comprising: a substantially U-shaped member formed from a resiliently flexible rod having a substantially uniform cross-sectional shape throughout its length, said U-shaped member having an arcuate end portion defining a portion of a circle lying substantially within a first plane and a pair of co-extensive and parallel elements integral with said arcuate end portion and curving out of said plane through angles in excess of 120 degrees, said elements defining a pair of planes substantially perpendicular to said first plane and spaced from each other a distance less than the diameter of said circle, the free ends of said elements including annular portions defining coaxial circles; a wheel-supporting axle extending through said annular portions for support thereby; a substantially circular mounting plate having a central, substantially planar portion with a central opening therethrough; an integral flange extending substantially around the periphery of said mounting plate, said arcuate end portion being snugly disposed within and embraced by said flange, and rigidly held with respect to said plate, said peripheral flange having a substantially circular cross section beyond which the adjacent parts of said parallel elements extend; a spindle extending through said central opening and substantially above said mounting plate for reception into the downwardly opening recess in the object, said spindle having a pair of annular, external flanges snugly embracing the opposite sides of said mounting plate, the portion of the spindle disposed between said flanges being of substantially the same size and cross-sectional shape as said opening.

References Cited in the file of this patent

UNITED STATES PATENTS

| | | |
|---|---|---|
| 800,377 | Kurtz | Sept. 26, 1905 |
| 868,067 | Berry | Oct. 15, 1907 |
| 1,382,052 | Birrell | June 21, 1921 |
| 1,516,762 | Decker | Nov. 25, 1924 |
| 1,591,057 | Schwartz | July 6, 1926 |
| 1,814,703 | Johnson | July 14, 1931 |
| 2,170,472 | Fitch | Aug. 22, 1939 |
| 2,453,916 | Inskeep | Nov. 16, 1948 |
| 2,584,696 | Graham | Feb. 5, 1952 |
| 2,707,945 | Hughes | May 10, 1955 |

FOREIGN PATENTS

| | | |
|---|---|---|
| 450,893 | Great Britain | July 27, 1936 |